United States Patent
Huizenga et al.

(10) Patent No.: US 11,092,023 B2
(45) Date of Patent: *Aug. 17, 2021

(54) CERAMIC MATRIX COMPOSITE NOZZLE MOUNTED WITH A STRUT AND CONCEPTS THEREOF

(71) Applicant: General Electric Company, Schenectady, NY (US)

(72) Inventors: Benjamin Scott Huizenga, Cincinnati, OH (US); Christopher Charles Glynn, Lawrenceburg, IN (US); Darrell Glenn Senile, Oxford, OH (US); Robert Alan Frederick, West Chester, OH (US); Michael Todd Radwanski, Newport, KY (US); Michael Ray Tuertscher, Fairfield, OH (US); Greg Scott Phelps, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 15/885,069

(22) Filed: Jan. 31, 2018

(65) Prior Publication Data
US 2020/0088051 A1    Mar. 19, 2020

Related U.S. Application Data

(62) Division of application No. 14/574,472, filed on Dec. 18, 2014, now Pat. No. 9,915,159.

(51) Int. Cl.
*F01D 9/04* (2006.01)
*F01D 25/16* (2006.01)
*F02C 7/20* (2006.01)

(52) U.S. Cl.
CPC .............. *F01D 9/047* (2013.01); *F01D 9/041* (2013.01); *F01D 25/16* (2013.01); *F01D 25/162* (2013.01);
(Continued)

(58) Field of Classification Search
CPC .......... F01D 9/047; F01D 9/041; F01D 25/16; F01D 25/162; F02C 7/20; F05D 2230/642; F05D 2300/6033; Y02T 50/672
See application file for complete search history.

(56) References Cited

U.S. PATENT DOCUMENTS 5,176,496 A * 1/1993 Correia .................. F01D 9/042
                                                415/189
5,332,360 A    7/1994 Correia et al.
(Continued)

FOREIGN PATENT DOCUMENTS

CN    101153544 A    4/2008
EP    1965031 A3    4/2011
(Continued)

OTHER PUBLICATIONS

European Search Report and Opinion issued in connection with corresponding EP Application No. 15199348.2 dated Apr. 29, 2016.
(Continued)

*Primary Examiner* — Richard A Edgar
(74) *Attorney, Agent, or Firm* — Dority & Manning, P.A.

(57) ABSTRACT

A nozzle assembly is provided which is, in part, formed of a low coefficient of thermal expansion material. The assembly includes a nozzle fairing formed of the low coefficient of thermal expansion material and includes a metallic strut extending radially through the nozzle fairing. Load is transferred from the nozzle fairing to a static structure in either of two ways: first, the strut may receive the load directly and/or second, load may be transferred from the nozzle (Continued)

fairing to at least one of the inner and outer support rings. Further, the nozzle fairing and strut may allow for internal airflow for cooling.

20 Claims, 15 Drawing Sheets

(52) U.S. Cl.
CPC .......... *F02C 7/20* (2013.01); *F05D 2230/642* (2013.01); *F05D 2300/6033* (2013.01); *Y02T 50/60* (2013.01)

(56) References Cited

U.S. PATENT DOCUMENTS

| | | | |
|---|---|---|---|
| 6,464,457 B1 | 10/2002 | Morgan et al. | |
| 6,554,563 B2* | 4/2003 | Noe | F01D 5/189 |
| | | | 415/115 |
| 6,652,229 B2 | 11/2003 | Lu | |
| 6,932,568 B2 | 8/2005 | Powis et al. | |
| 7,008,178 B2 | 3/2006 | Busch et al. | |
| 7,008,185 B2 | 3/2006 | Peterman et al. | |
| 7,114,917 B2 | 10/2006 | Legg | |
| 7,625,170 B2 | 12/2009 | Greene et al. | |
| 7,798,775 B2 | 9/2010 | Kammel et al. | |
| 8,292,573 B2 | 10/2012 | Broomer et al. | |
| 8,292,580 B2* | 10/2012 | Schiavo | F01D 5/189 |
| | | | 416/229 A |
| 8,684,680 B2 | 4/2014 | Martin et al. | |
| 2006/0171812 A1 | 8/2006 | Albrecht et al. | |
| 2007/0025837 A1 | 2/2007 | Pezzetti, Jr. et al. | |
| 2010/0068034 A1 | 3/2010 | Schiavo et al. | |
| 2010/0132374 A1* | 6/2010 | Manteiga | F01D 9/02 |
| | | | 60/796 |
| 2011/0236183 A1 | 9/2011 | Amaral et al. | |
| 2011/0299978 A1 | 12/2011 | Afanasiev et al. | |
| 2011/0318171 A1 | 12/2011 | Albers et al. | |
| 2012/0251314 A1 | 10/2012 | Beaujard et al. | |
| 2013/0028717 A1 | 1/2013 | Helvaci et al. | |
| 2013/0089414 A1 | 4/2013 | Harding | |
| 2013/0115065 A1 | 5/2013 | Correia et al. | |
| 2013/0177387 A1 | 7/2013 | Rioux | |
| 2013/0315708 A1 | 11/2013 | Rendon | |
| 2014/0234118 A1 | 8/2014 | Beaujard et al. | |
| 2015/0093249 A1 | 4/2015 | Lang et al. | |
| 2016/0084096 A1* | 3/2016 | Carr | F01D 25/246 |
| | | | 60/805 |
| 2016/0169050 A1* | 6/2016 | Scott | F02C 7/20 |
| | | | 415/213.1 |
| 2016/0177757 A1* | 6/2016 | Sarawate | F01D 25/162 |
| | | | 415/1 |
| 2016/0230593 A1* | 8/2016 | Zelesky | F01D 25/005 |
| 2017/0022833 A1* | 1/2017 | Heitman | F01D 25/243 |
| 2017/0081966 A1* | 3/2017 | Huizenga | F01D 5/02 |
| 2017/0204734 A1* | 7/2017 | Groves, II | F01D 9/065 |

FOREIGN PATENT DOCUMENTS

| | | |
|---|---|---|
| EP | 2055900 A3 | 2/2012 |
| EP | 2481988 A2 | 8/2012 |
| EP | 2 587 099 A1 | 5/2013 |
| JP | S62605 A | 1/1987 |
| JP | H06146805 A | 5/1994 |
| JP | H07150905 A | 6/1995 |
| JP | H08226304 A | 9/1996 |
| JP | 2004/257389 A | 9/2004 |
| JP | 2005/201257 A | 7/2005 |
| JP | 2010/127277 A | 6/2010 |
| WO | 2014070438 A1 | 5/2014 |
| WO | 2015009392 A2 | 1/2015 |

OTHER PUBLICATIONS

European Search Report and Opinion issued in connection with Related EP Application No. 16193752.9 dated Feb. 22, 2017.
Chinese Office Action and Search Report Corresponding to Application No. 201510949677 dated Oct. 8, 2018.
Machine Translated Japanese Search Report Corresponding to Application No. 2015240682 dated Sep. 19, 2019.
Machine Translated Japanese Office Action Corresponding to Application No. 2015240682 dated Sep. 24, 2019.

* cited by examiner

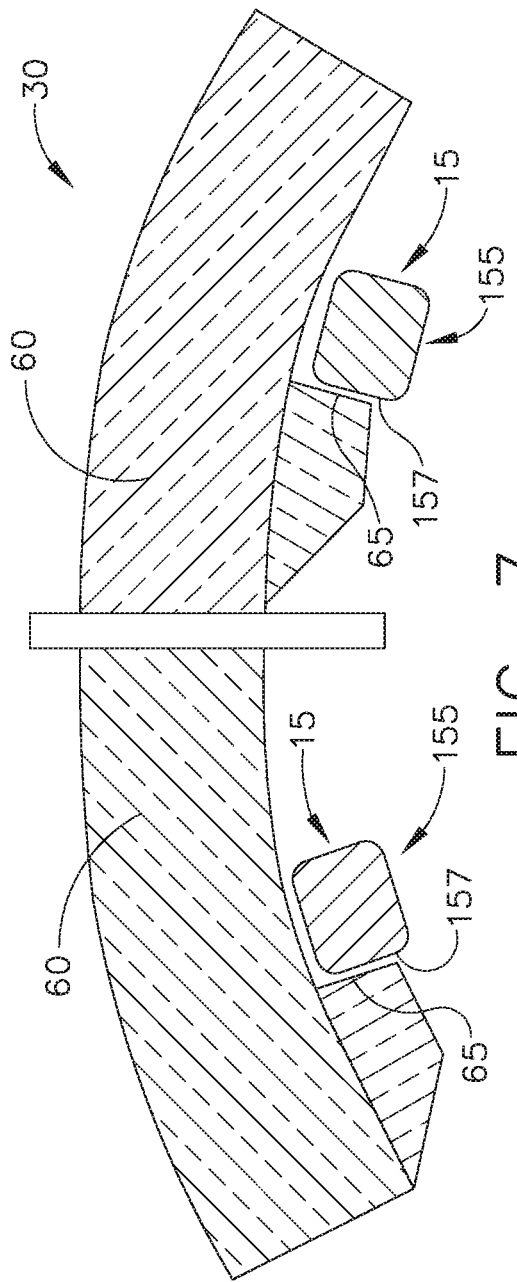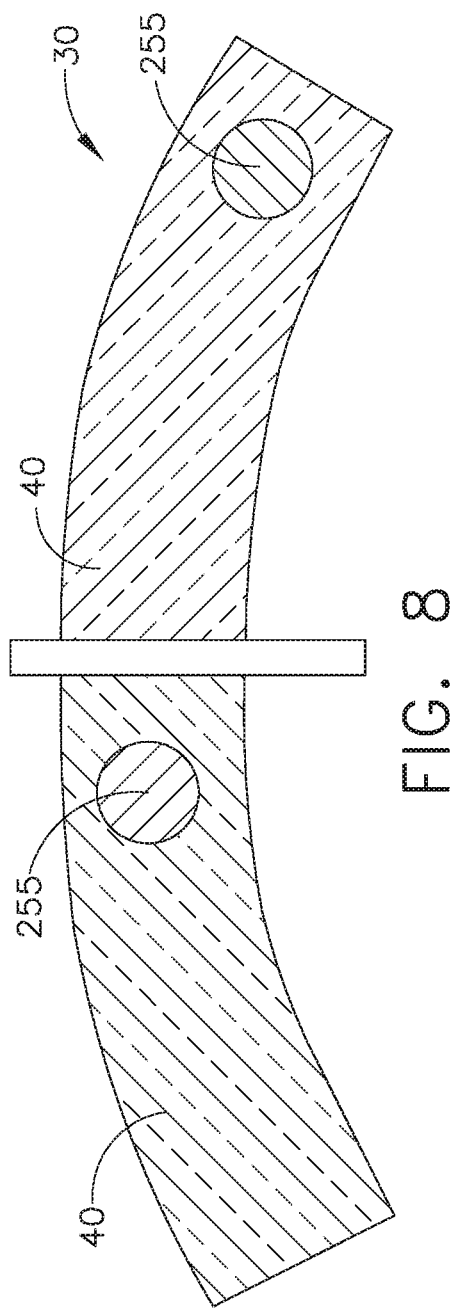

CERAMIC MATRIX COMPOSITE NOZZLE MOUNTED WITH A STRUT AND CONCEPTS THEREOF

CROSS-REFERENCE TO RELATED APPLICATION

This application is a divisional of U.S. application Ser. No. 14/574,472, filed on Dec. 18, 2014 and entitled Ceramic Matrix Composite Nozzle Mounted with a Strut and Concepts Thereof, which is hereby expressly incorporated herein by reference in its entirety.

TECHNICAL FIELD

Present embodiments generally relate to a composite nozzle segment assembly. More specifically, present embodiments relate to a composite nozzle segment assembly including a strut providing structural support.

BACKGROUND

A gas turbine engine includes a turbomachinery core having a high pressure compressor, combustor, and high pressure turbine ("HPT") in serial flow relationship. The core is operable in a known manner to generate a primary gas flow. The high pressure turbine includes annular arrays ("rows") of stationary vanes or nozzles that direct the gases exiting the combustor into rotating blades or buckets. Collectively one row of nozzles and one row of blades make up a "stage". Typically two or more stages are used in serial flow relationship. These components operate in an extremely high temperature environment, and must be cooled by air flow to ensure adequate service life.

HPT nozzles are often configured as an array of airfoil-shaped vanes extending between annular inner and outer bands which define the primary flowpath through the nozzle.

Due to operating temperatures within the gas turbine engine, it is desirable to utilize materials with low coefficient of thermal expansion. For example, to operate effectively in such strenuous temperature and pressure conditions, composite materials have been suggested and, in particular for example, ceramic matrix composite (CMC) materials. These low coefficient of thermal expansion materials have higher temperature capability than metallic parts. The higher operating temperatures within the engine result in higher engine efficiency. However, such ceramic matrix composite (CMC) have mechanical properties that must be considered during the design and application of the CMC. CMC materials have relatively low tensile ductility or low strain to failure when compared to metallic materials. Also, CMC materials have a coefficient of thermal expansion which differs significantly from metal alloys used as restraining supports or hangers for CMC type materials. Therefore, if a CMC component is restrained and cooled on one surface during operation, stress concentrations can develop leading to failure of the segment.

Prior art nozzles formed of CMC materials have been attempted with limited success. These nozzles must have constructions wherein load controlled stresses are minimized. Attempts have been made to carry pressure loads acting on the CMC nozzle to support at the outer and inner bands of the nozzle. Generally, moments are created at the fillets of the inner and outer bands to accomplish this construction. This results in high stresses at the interfaces of the vanes and bands, creating durability challenges for the CMC components.

It would be desirable to improve known nozzle assemblies in order to eliminate the creation of moment at the interface between the nozzle and associated attachment features. It would further be desirable to provide an assembly to support the CMC nozzle while limiting load on the part. It would further be desirable to allow for differential thermal growth between parts of differing material types.

The information included in this Background section of the specification, including any references cited herein and any description or discussion thereof, is included for technical reference purposes only and is not to be regarded subject matter by which the scope of the invention is to be bound.

SUMMARY

A nozzle assembly is provided which is, in part, formed of a low coefficient of thermal expansion material. The assembly includes a nozzle fairing formed of the low coefficient of thermal expansion material and includes a metallic strut extending radially through the nozzle fairing. Load is transferred from the nozzle fairing to a static structure in either of two ways: first, the strut may receive the load directly and/or second, load may be transferred from the nozzle fairing to at least one of the inner and outer support rings. Further, the nozzle fairing and strut may allow for internal airflow for cooling.

According to some embodiments, a nozzle segment assembly comprises an outer support ring and an inner support ring, a nozzle fairing formed of a low coefficient of thermal expansion material having an outer band and an inner band, the nozzle fairing further having an vane extending between the outer band and the inner band, a metallic strut extending between the outer support ring and the inner support ring, the strut providing for load transfer between at least one pair of said nozzle fairing and the strut or said nozzle fairing and at least one of an inner and outer support ring, the metallic strut extending through the nozzle fairing and allowing growth of the strut through the vane.

All of the above outlined features are to be understood as exemplary only and many more features and objectives of the structures and methods may be gleaned from the disclosure herein. Therefore, no limiting interpretation of the summary is to be understood without further reading of the entire specification, claims and drawings included herewith.

BRIEF DESCRIPTION OF THE ILLUSTRATIONS

The above-mentioned and other features and advantages of these embodiments, and the manner of attaining them, will become more apparent and the embodiments will be better understood by reference to the following description taken in conjunction with the accompanying drawings, wherein:

FIG. 1 side section view of an exemplary gas turbine engine;

FIG. 7 is a first section view of a nozzle and lug joint;

FIG. 8 is a second section view of a nozzle and pin joint;

DETAILED DESCRIPTION

Figure 1:
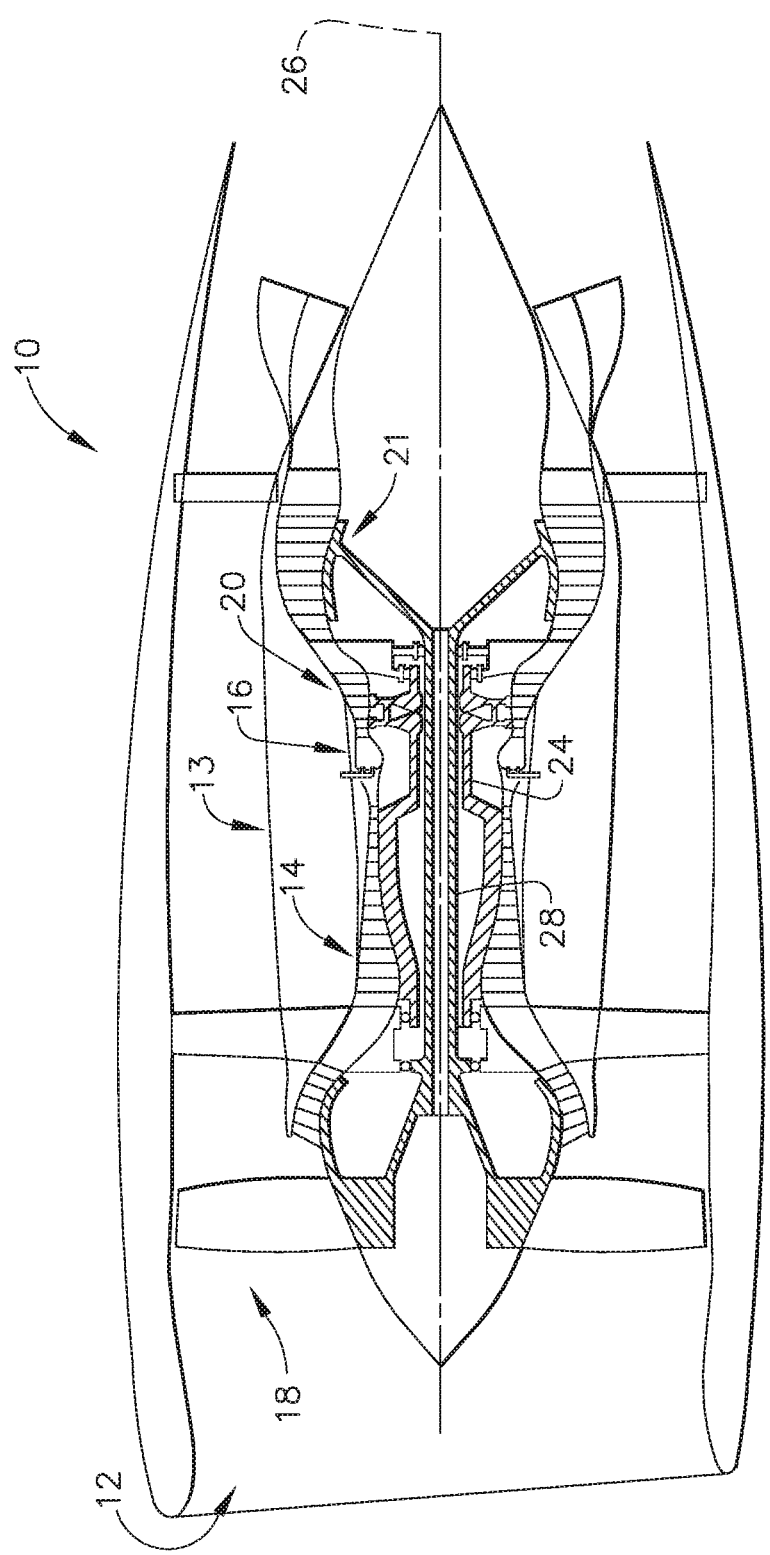

It is to be understood that the depicted embodiments are not limited in application to the details of construction and the arrangement of components set forth in the following description or illustrated in the drawings. The depicted embodiments are capable of other embodiments and of being practiced or of being carried out in various ways. Each example is provided by way of explanation, not limitation of the disclosed embodiments. In fact, it will be apparent to those skilled in the art that various modifications and variations may be made in the present embodiments without departing from the scope or spirit of the disclosure. For instance, features illustrated or described as part of one embodiment may be used with another embodiment to still yield further embodiments. Thus it is intended that the present disclosure covers such modifications and variations as come within the scope of the appended claims and their equivalents.

Embodiments of a nozzle segment assembly are depicted in FIGS. 1-16. The nozzle segment assembly utilizes a material having a low coefficient of thermal expansion, such as for example, ceramic matrix composite material. The assembly further comprises a strut formed of an alternative material such as a metallic material which is capable of carrying higher loading than the low coefficient of thermal expansion material. The strut carries loading through the nozzle segment assembly and on to engine support hardware.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rear of the engine.

As used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring initially to FIG. 1, a schematic side section view of a gas turbine engine 10 is shown. The function of the gas turbine engine 10 is to extract energy from high pressure and temperature combustion gases and convert the energy into mechanical energy for work. The gas turbine engine 10 has an engine inlet end 12 wherein air enters the core propulsor 13 which is defined generally by a compressor 14, a combustor 16 and a multi-stage high pressure turbine 20 all located along an engine axis 26. Collectively, the core propulsor 13 provides thrust or power during operation. The gas turbine engine 10 may be used for aviation, power generation, industrial, marine or the like.

In operation, air enters through the engine inlet end 12 of the gas turbine engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn causes rotation of the shaft 24. The shaft 24 passes toward the front of the gas turbine engine 10 to continue rotation of the one or more compressor 14 stages, a turbofan 18 or inlet fan blades, depending on the turbine design. The turbofan 18 is connected by the shaft 28 to a low pressure turbine 21 and creates thrust for the gas turbine engine 10. The low pressure turbine 21 may also be utilized to extract further energy and power additional compressor stages.

Figure 2:
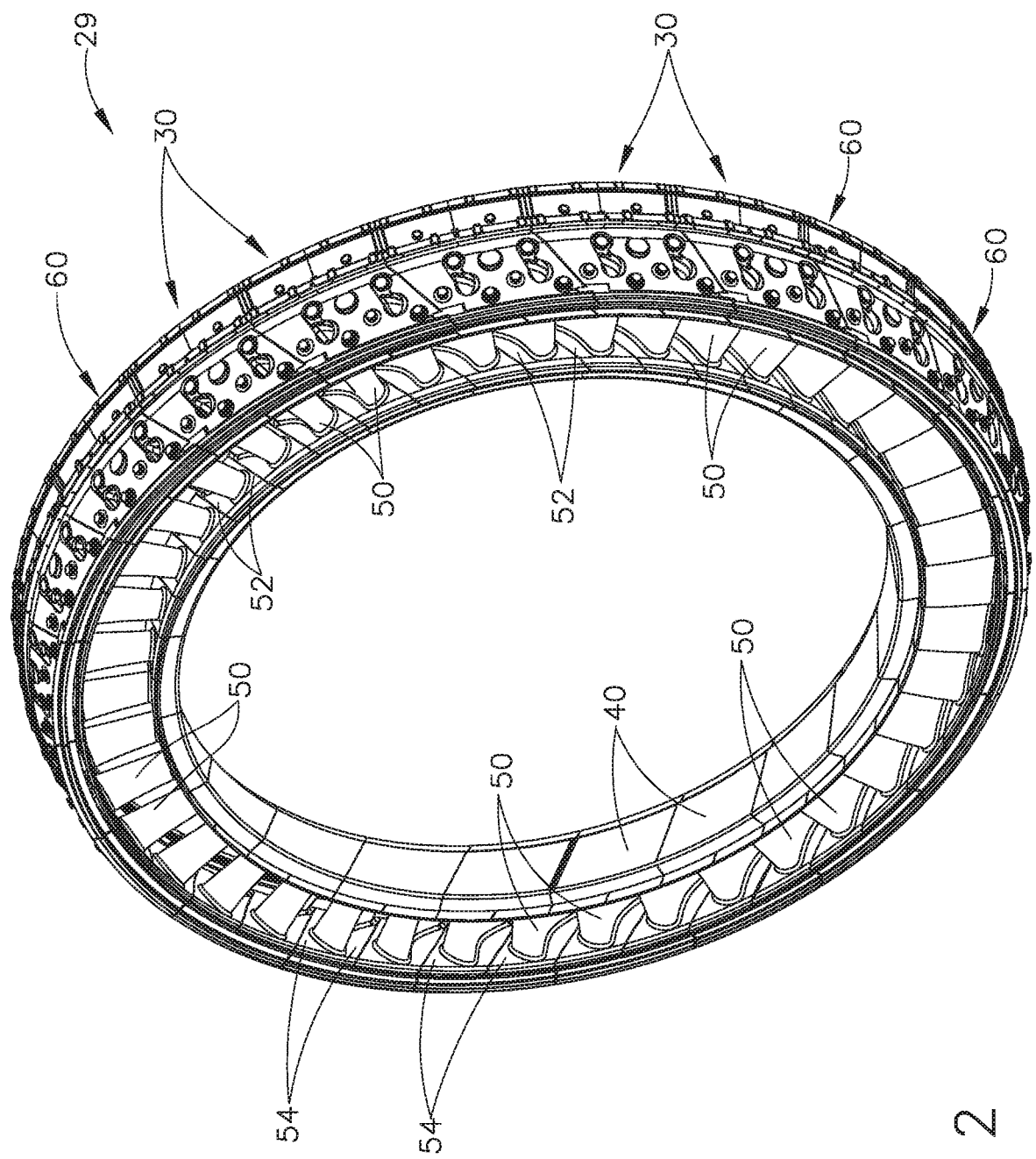
FIG. 2 is a perspective view of an exemplary nozzle ring formed by a plurality of nozzle segment assemblies.
Figure 5:
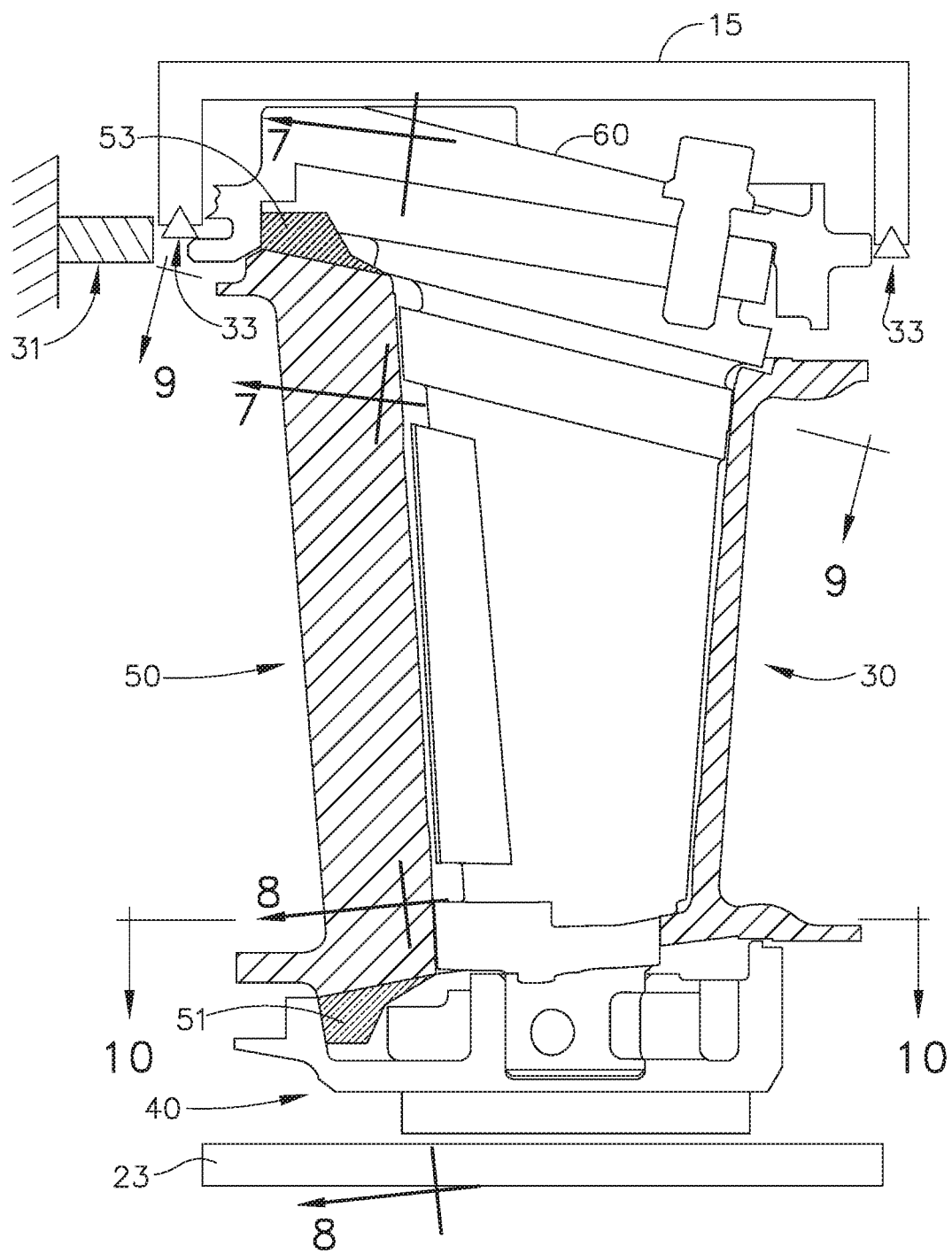
FIG. 5 is a schematic section view of various mounting options for the nozzle segment assemblies.

With reference now to FIG. 2, a perspective view of a nozzle ring 29 is depicted. The nozzle ring 29 may be located within the high pressure turbine 20 and/or low pressure turbine 21 (FIG. 1). The nozzle ring 29 is formed of one or more nozzle segment assemblies 30. The nozzle segment assemblies 30 direct the combustion gases downstream through a subsequent row of rotor blades (not shown) extending radially outwardly from a supporting rotor 23 (FIG. 5). The nozzle ring 29 and plurality of nozzle segment assemblies 30 defining the nozzle ring 29 aid in energy extraction by the rotor 23 (FIG. 5). Additionally, nozzles may be utilized in the compressor 14 which may be either of a high pressure or low pressure compressor. The nozzle ring 29 includes an inner band 52 and an outer band 54 and a plurality of struts 70 (FIG. 3) extending through nozzle fairings 50. The inner and outer bands 52, 54 extend 360 degrees defining the nozzle ring 29 about the engine axis 26 (FIG. 1).

Figure 3:
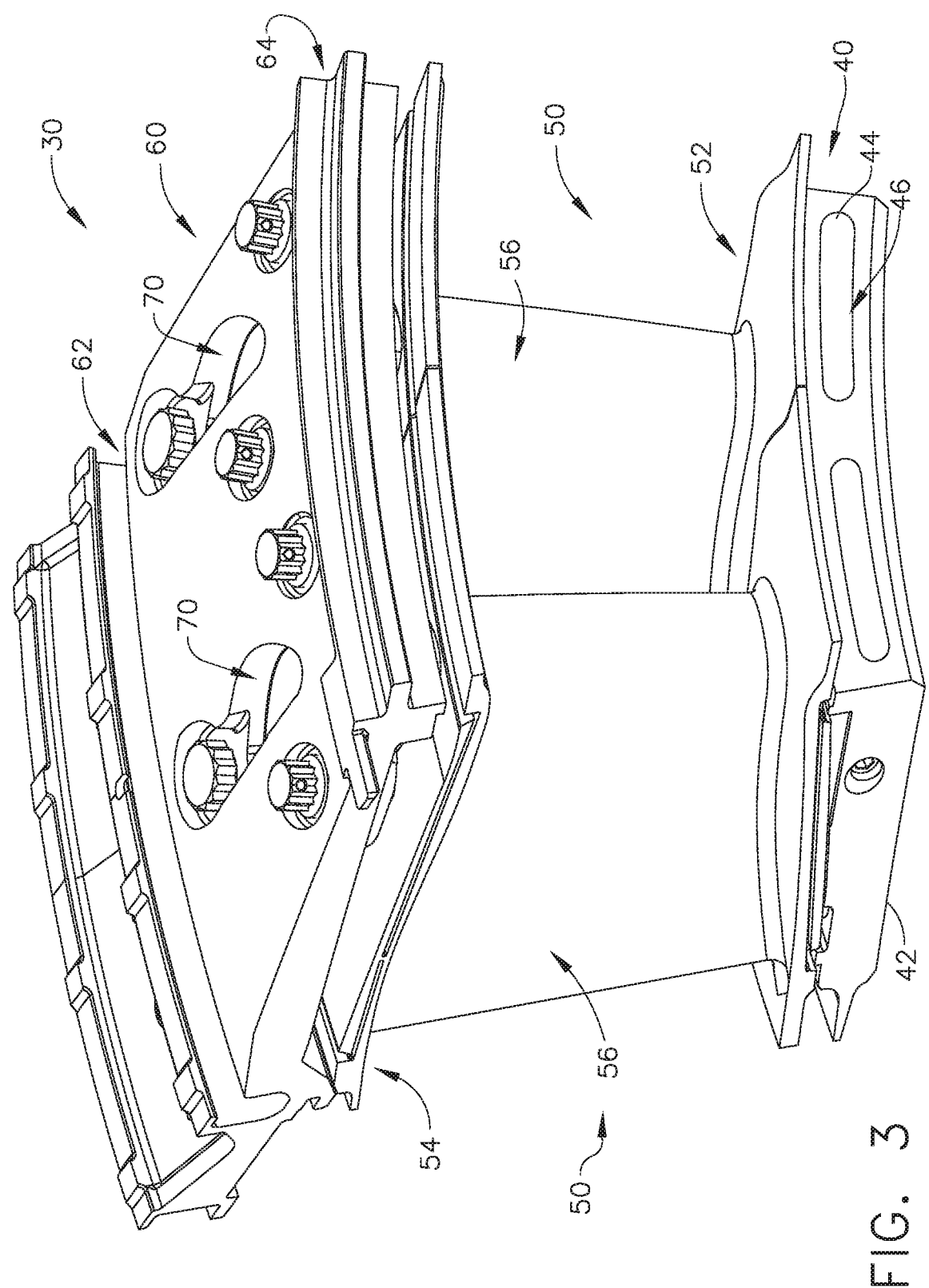
FIG. 3 is a perspective assembly view of the nozzle segment assembly including strut extending through fairing.

The nozzle ring 29 is formed of a plurality of nozzle segment assemblies 30 each of which includes an inner support ring 40, at least one nozzle fairing 50 and a hanger or outer support ring 60. Extending through at least one nozzle fairing 50 is a strut 70 (FIG. 3). The strut 70 carries load from the radially inward side of the nozzle segment assembly 30 at the inner support ring 40 to the radially outward side at the outer support ring 60 where load is transferred to a static structure 15 and mechanically supports the nozzle fairing 50. The strut 70 may be connected to at least one of the inner support ring 40 and the outer support ring in a variety of manners described herein including by bolting, fastening, capturing, combinations thereof and being integrally formed.

Referring now to FIG. 3, a perspective view of an exemplary nozzle segment assembly 30 is depicted. The nozzle segment assembly 30 is shown having a forward end at the right side of the figure and an aft end toward the left side of the figure. The nozzle segment assembly 30 is located between an upstream rotating turbine blade and a downstream rotating turbine blade. The nozzle segment assembly 30 receives combustion gas flow from upstream rotating turbine blades (not shown). The flow of combustion gas is turned by the nozzle segment assembly 30 in order to increase work output at the downstream turbine blades (not shown).

Starting at the lower end of the nozzle segment assembly 30, the inner support ring 40 extends circumferentially defining a portion of the nozzle segment assembly 30. The inner support ring 40 also extends axially defining a lower end of the segment of nozzle segment assembly 30. The inner support ring 40 includes a lowermost surface 42 which extends circumferentially and axially and the radially upwardly extending surface 44 wherein a plurality of cooling holes are disposed. Angel wings may extend at forward and aft ends of the inner support ring 40.

Disposed above the inner support ring 40 is the at least one fairing 50. The fairing 50 may be of the single vane type, generally known as a "singlet" or may be of the double vane type generally known as a "doublet". These are merely exemplary as additional numbers of vanes may be utilized in the nozzle segment assembly 30. The fairing 50 includes an inner band 52, an outer band 54 and at least one vane 56 extending between the inner and outer bands 52, 54. The upper surface of the inner band 52 provides one flow surface for combustion gas. The lower surface of the outer band 54 provides an opposite flow surface for the combustion gas. These surfaces define boundaries for flow of combustion gas through the nozzle segment assembly 30 with the vane 56 extending therebetween.

Disposed above the fairing 50 is the outer support ring 60 which connects the nozzle segment assembly 30 to a static structure 15. The outer support ring 60 also extends circumferentially and axially between a forward end 64 and an aft end 62. The outer support ring 60 further captures the fairing 50 on the strut 70 between the outer support ring 60 and the inner support ring 40. The strut 70 is fastened to the outer support ring 60 and connected to the inner support ring 40 to transfer load through the nozzle segment assembly 30. The fairing 50 is positioned to float on the strut 70 and is captured between the outer support ring 60 and inner support ring 40.

Figure 4:
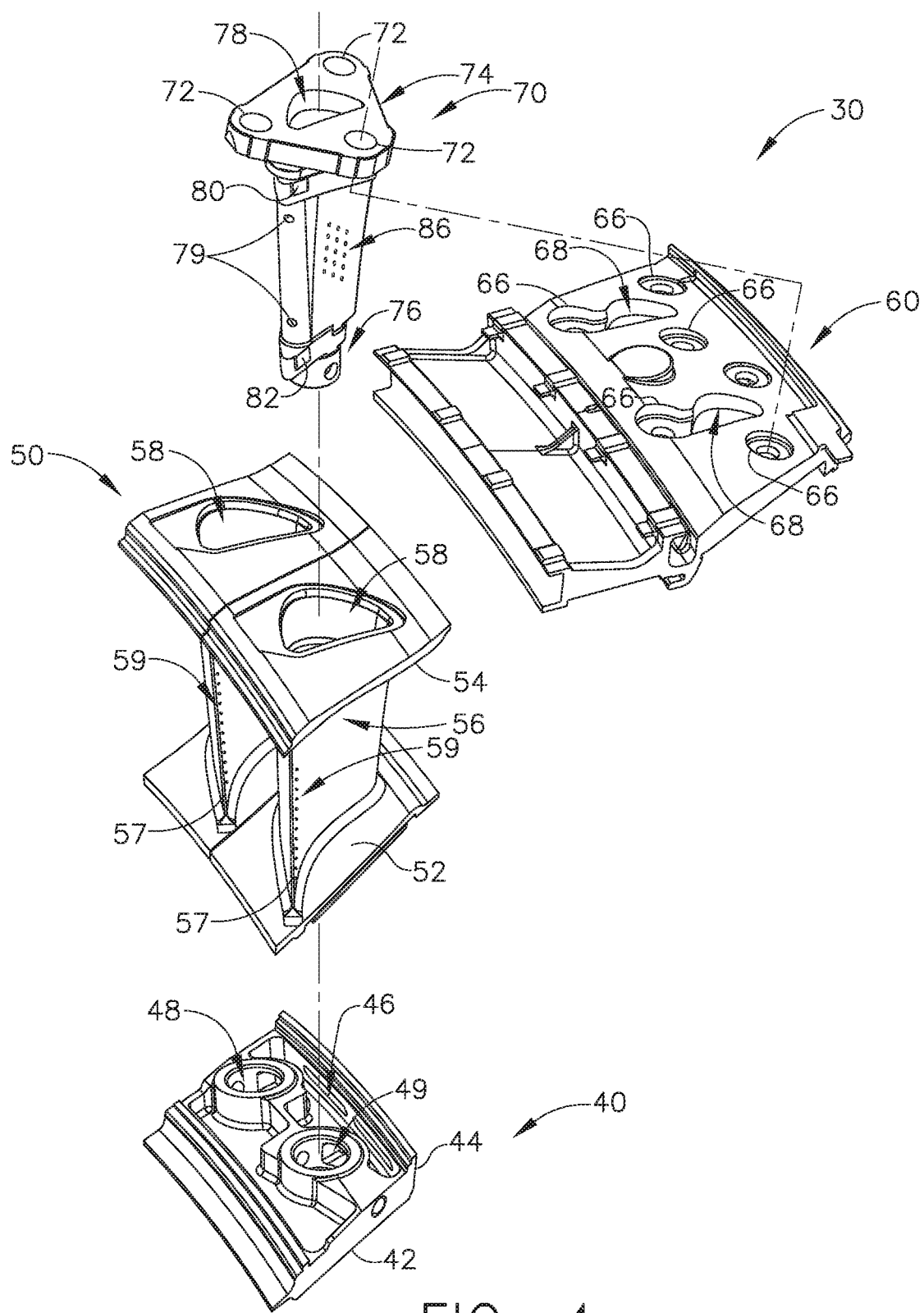
FIG. 4 is an exploded assembly view of the nozzle segment assembly of FIG. 3.

Referring now to FIG. 4, an exploded perspective view of the nozzle segment assembly 30 is depicted. The inner support ring 40 includes the radially lower surface 42 and the radially outwardly extending upper surface 44, extending from the forward end of the lower surface 42. Disposed through the upper surface 44 are a plurality of rotor purge feed holes 46 which receive cooling air through the nozzle segment assembly 30 and feeds out through the inner support ring 40. The feed holes 46 are in flow communication with circular collars 48, 49 positioned on the inward surface 42 of the inner support ring 40. The feed holes 46 allow air to exit the inner support ring 40 in either or both of a circumferential or axial direction. The collars 48, 49 receive the strut 70 providing engagement with the inner support ring 40 and may be fastened, according to one embodiment, through a slip-fit pin connection capturing the strut 70 in the inner support ring 40. A second portion 45 (FIG. 12) is positioned between the upper edge of the collars 48, 49 and the upper surface 44 creating a flow cavity between collars 48, 49 and the rotor purge feed holes 46. The lower surface 42 of the inner support ring 40 may include a honeycomb layer as known to one skilled in the art.

Positioned above the inner support ring 40 are fairings 50 including the inner band 52, the outer band 54 and the vane 56. The interior of the vane 56 is at least partially hollow defining a cooling flowpath 58. The vane 56 may include a plurality of film holes 59 along an outer surface of the vane to provide cooling for the vane 56. For example, the vane 56 may include a plurality of film holes 59 along the trailing edge 57 in order to cool this area of the vane 56 where hotspots may form. Other locations of the vane 56 may further comprise cooling film holes in order to provide a desirable operating temperature for the vane 56.

The cooling flowpath 58 further comprises a secondary function which is to receive the strut 70 therein. When assembled, the strut 70 extends downwardly through the outer band 54, the vane 56 in the inner band 52 so that a lower end of the strut 70 engages the inner support ring 40. According to this embodiment, the strut 70 is positioned within the collars 48, 49 and may be connected in a variety of manners including, but not limited to, a slip-fit pin connection. Further, although a single strut 70 is shown, additional struts may be utilized by each of the vanes 56. Thus in the exemplary embodiment, where nozzle segment assembly 30 is shown with a fairing 50 having two vanes 56, two struts 70 would be utilized in this exemplary embodiment.

The outer support ring 60 is positioned on the radially outward side of the upper band 54. The outer support ring 60 includes a plurality of fastening apertures 66 and a cooling flowpath 68. Alternatively, fastening apertures 66 could extend from a flange 74 and be fastened by nuts or like fasteners at the outer support ring 60.

The cooling flowpath 58 of the fairings 50 is in flow communication with the flowpath 68 of the outer support ring 60. Cooling air is capable of moving through the outer support ring 60 and downwardly through the strut 70 to cool the vanes 56 to move further radially inwardly to the inner support ring 40.

The strut 70 is positioned downwardly through the fairing 50 and is captured in this position by outer support ring 60 and inner support ring 40. The plurality of fastening apertures 66 align with fastening holes 72 disposed in the flange 74 of the strut 70 to connect these structures. The flange 74 is positioned at an upper end of the strut 70 and a seal box interface 76 is located at a lower end of the strut 70. A fastener (not shown) may extend through the outer support ring 60 and the flange 74. Extending between the flange 74 and the seal box interface 76, the strut 70 is shaped to match the shape of flowpath 58. In the exemplary embodiment, the strut 70 is shaped having an airfoil-like profile to fit within the similarly shaped cooling flowpath 58. However, various alternate shapes may be utilized. At a trailing edge of the strut 70 are a plurality of cooling holes 79 which are in flow communication with a cooling path 78. The cooling path 78 receives flow through the outer support ring 60 at cooling flowpath 68 which enters the strut 70 and either passes through the cooling holes 79 or continues downwardly to the seal box interface 76 for dispersion through the inner support ring 40. Additionally, the strut 70 may include cooling holes 86 which provide cooling air to the vanes 56. One skilled in the art will understand that at least the flowpaths 58, 68, 78 and collars 48, 49 also define cavities through the nozzle assembly 30 allowing cooling air to move there through when assembled.

The strut 70 further comprises a plurality of load bearing pads 80 near an upper end and beneath the flange 74. The load bearing pads 80 are primarily located on the side of the strut 70 corresponding to the pressure side of the vanes 56. Similarly, load bearing pads 82 are located at a lower end above the seal box interface 76. The pads 80, 82 locate the fairing 50 properly unto the strut 70. During operation, the pressure side of the vane creates a lateral and tangential load on the fairings 50 and the pads 80, 82 transfer the load to the strut 70, thereby limiting load application on the CMC fairing structure 50. The pads 80, 82 provide a way to engage the strut 70 and fairing 50 while limiting tangential load transferred to the fairing 50. Alternatively stated, the nozzle segment assembly 30 allows for load transfer through the strut 70 with minimal stress on the fairing 50. In this nozzle segment assembly 30, the fairing 50 may float radially along the strut 70 between the inner support ring 40 and outer support ring 60. Despite the differing materials of the fairing 50 and strut 70, the parts may grow at different rates without damaging the fairing 50.

The strut 70 is metallic and may be cast, machined or some combination thereof. The strut 70 is formed of a stronger material than the fairing 50. The remaining portions of the nozzle segment assembly 30 may be formed of some low coefficient of thermal expansion material, including but not limited to CMC.

Referring now to FIG. 5, a side section view of an exemplary nozzle segment assembly 30 is depicted with schematic connections for purpose of description. The nozzle segment assembly 30 may be connected to a static structure 15 of the gas turbine engine 10, for example the engine casing. The nozzle segment assembly 30 may be mounted in a cantilevered fashion or alternatively hung from the outer support ring 60. For example, a cantilevered connection 31 may be at an upper end at one of the axially forward end or axially aft end of each nozzle segment assembly 30. Still further, the nozzle segment assembly 30 may be cantilevered from a lower mount or from an upper mount as in the depicted configuration. As used herein, the term "cantilevered" means supported at one end in either the radial or axial direction. Therefore, the inner support ring may be cantilevered from the outer support ring. Alternatively, the outer support ring may be cantilevered from the inner support ring. This may also include alone or in combination support at one or both axial ends. Also, both support rings may be supported so that neither is cantilevered.

Alternatively, the nozzle segment assembly 30 may be supported at the outer support ring 60 at both of the forward and aft ends at supports 33. Still further, static structures 15 may be located at the radially inward end of the nozzle segment assembly 30, for example near the inner support ring 40 (FIG. 3), in order to provide support at a radially inward location. In these arrangements, the nozzle segment assembly 30 is supported from a static structure 15, for example an engine casing, which is radially outward of the nozzle segment assembly 30. Alternatively, or in addition, static structure 15 may extend to a position radially inward of the nozzle segment assembly 30. Additionally, the nozzle segment assembly 30 may support axial loading as may be gleaned from the depicted schematic connections. A rotor 23 may be located radially inward of the nozzle segment assembly 30.

The embodiment also depicts the transfer of axial load from the nozzle vane 50 through the inner support ring 40 and the outer support ring 60. Near lower and upper ends of the nozzle faring 50 are studs 51, 53. At the inner and outer support rings 40, 60, the studs 51, 53 are positioned to engage and allow transfer of axial load. In the depiction, the axial load transfer may be generally in a left-right direction due to the purely radial engagement of surfaces such as at the outer support ring 60 with stud 53. Additionally, or alternatively, the axial load transfer may also be angled slightly relative to the axial direction, as shown by the angled engaging surfaces of the studs 51, 53 and walls or flanges of the inner support ring 40.

Figure 9:
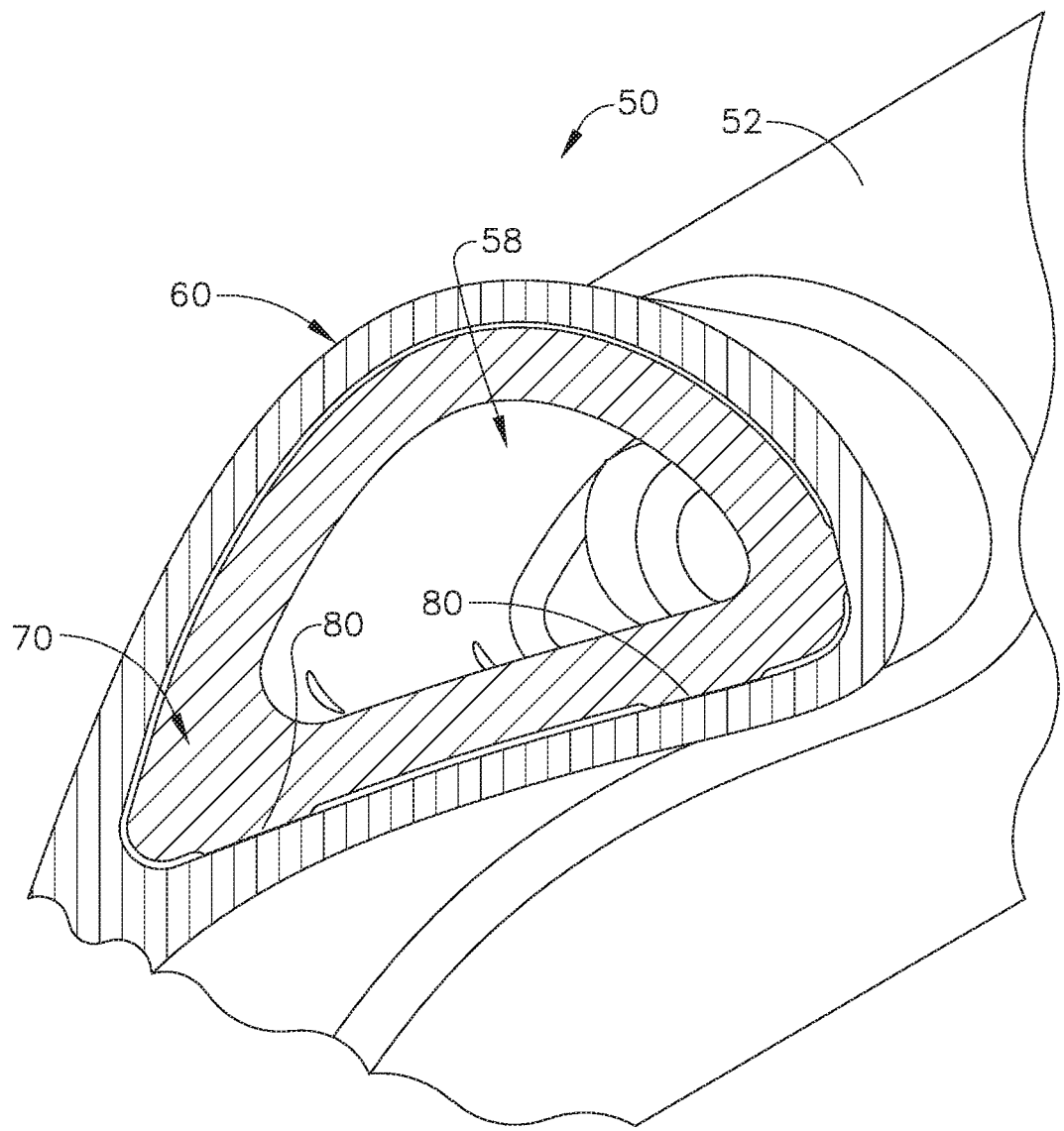
FIG. 9 is a section view taken at line 9-9 of FIG. 5
Figure 10:
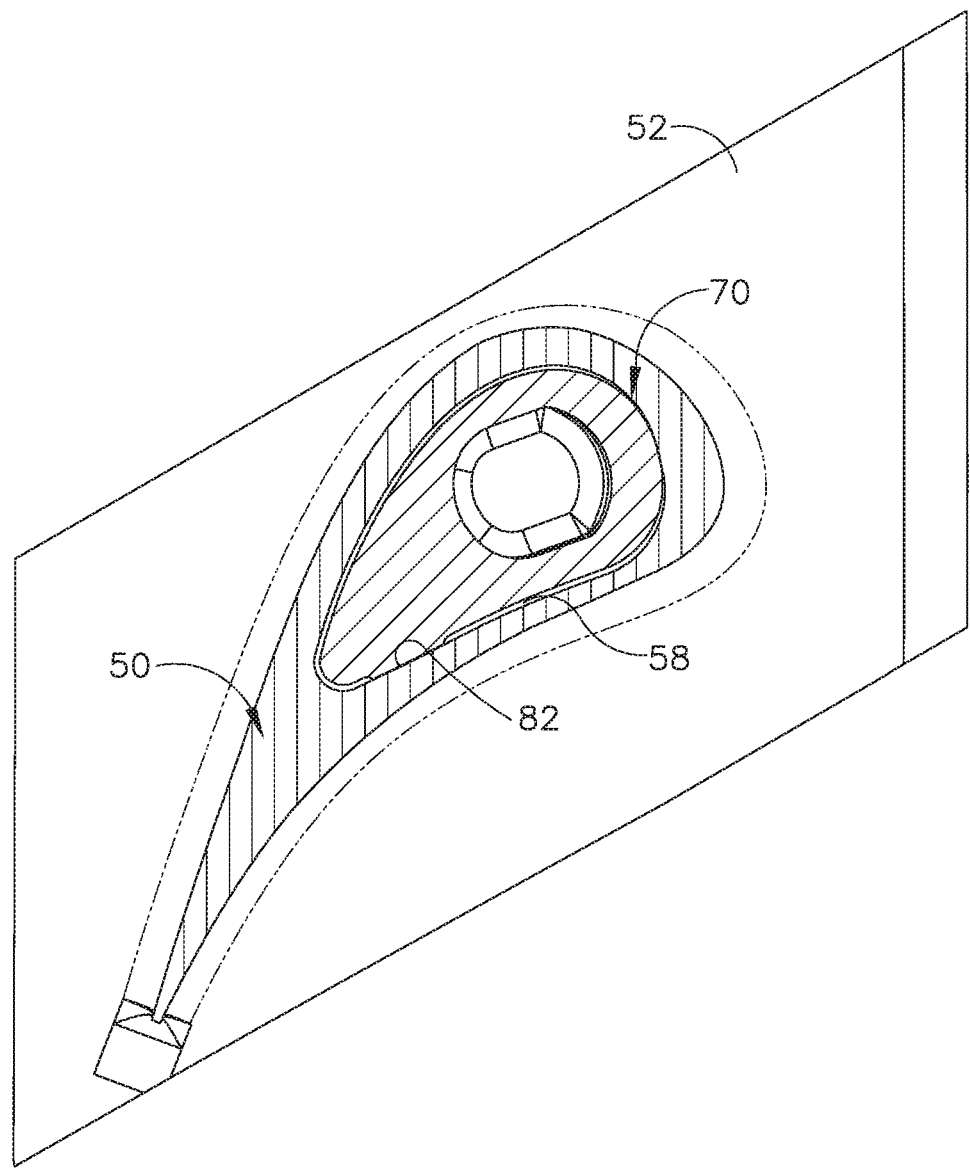
FIG. 10 is a section view taken at line 10-10 of FIG. 5.

Referring still to FIG. 5, the section view also depicts section line 9-9 which is shown in FIG. 9. Further, the section view depicts section line 10-10 which is shown in FIG. 10. These sections are taken through the nozzle segment assembly 30 for viewing at an angle to the radial direction and in a radial direction, respectively and will be discussed further herein.

Figure 6:
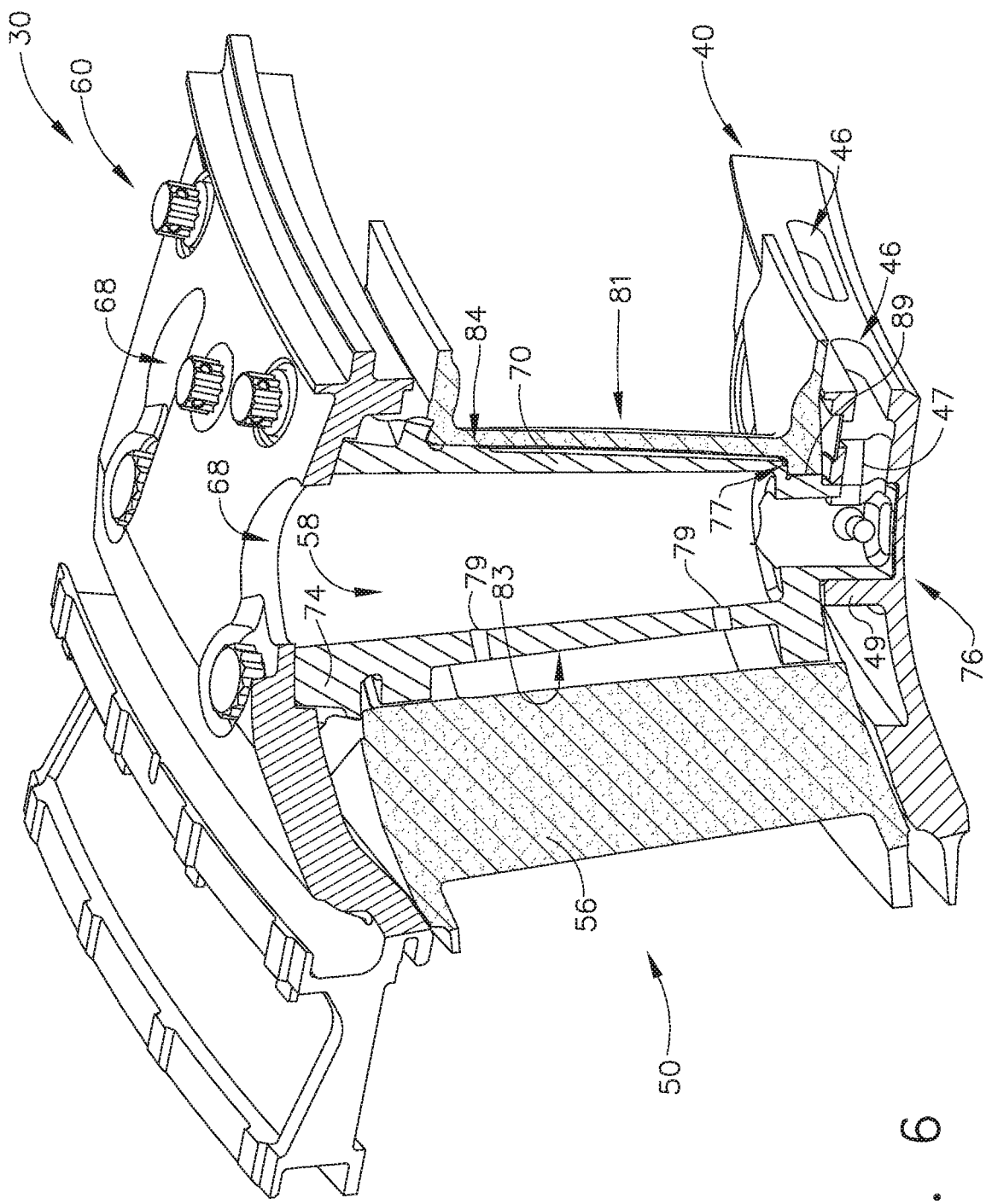
FIG. 6 is a partial section view of the nozzle assembly of FIG. 3.

Referring now to FIG. 6, a partially sectioned perspective view of the nozzle segment assembly 30 is shown. The section view depicts the construction and capture of the CMC fairing 50 and metallic strut 70 between the outer support ring 60 and the inner support ring 40. The instant embodiment utilized is fasteners extending through the outer support ring 60 and engaging the flange 74 of the strut 70. The seal box interface 76 extends into the collar 49 to capture the strut 70 in position between inner support ring 40 and the outer support ring 60. As shown in the section view, this also provides a flowpath for communication between the cooling flowpath 68 through the strut 70 and into the cavity 47 to feed the feed holes of the rotor purge feed holes 46.

As also shown, the cooling air moving through the struts 70 and cooling path 68 may pass outwardly through a plurality of cooling holes 79, 86 (FIG. 4) which are utilized to cool the vane 56. The vane 56 is at least partially hollow to positioning of the strut 70 therein and allows for cooling air to move along the interior of the vane to cooling film holes located along the vane.

FIG. 6 also depicts the capturing or sandwiching of the CMC fairing 50 at one or more locations between the strut 70 and the seal box or inner ring 40. The strut 70 includes a shoulder 77 which engages a protrusion 89 extending from the fairing 50. This provides a radially outer boundary. Radially below the shoulder 77, the nozzle fairing 50 may also be captured by the inner support ring 40. In this way, the strut 70 and inner support ring 40 capture the nozzle fairing 50 in position. This capturing or sandwiching may be utilized at various locations of engagement between the strut 70 and the fairing 50 to lock the assembly together and/or transfer load from the nozzle fairing 50 to the strut 70.

Referring now to FIG. 7, an axial schematic section view is depicted at the outer position of the nozzle segment assembly 30. The outer support ring 60 or some extension thereof may include a face 65 which extends in an axial direction and faces tangentially. Adjacent to the face 65 is a lug 155 which may extend from or connect to the static structure 15, for example an engine casing, and may have a corresponding lug face 157 which is opposite face 65. Since the lug 155 is fixed, it functions as an anti-clocking feature and reacts to tangential load created by the fairing 50 during operation. This allows transfer of tangential load from the nozzle fairing to the outer support ring 60.

The lug 155 may be formed of a plurality of cross-sectional shapes. As depicted, the shape is shown generically as a substantially square shaped cross section. However, other shapes may be used having the lug face 157 which is substantially parallel to the face 65 for engagement during operation. Alternatively, the lug face 157 may be a formed of varying shapes which extend from the static structure 15, or which is connected to such static structure 15 in order to support the tangential loading of the fairing nozzle segment assembly 30.

Referring now to FIG. 8, an axial schematic view of an alternative connection for the nozzle segment assembly 30 is provided. Whereas the previous embodiment accommodated tangential loading, the instant embodiment of FIG. 8 provides for either or both of tangential or radial loading. In the instant embodiment, an axial view of the inner support ring 40 is shown. The connection provides a pin 255 extending through the inner support ring 40 and extends in a generally axial direction or at an angle to the axial direction. This connection serves at least two purposes. First, the pin 255 supports radial loading of the inner support ring 40. Additionally, the pin 255 connection may support tangential loading of the inner support ring 40, as well. With respect to both embodiments of FIGS. 7 and 8, the strut 70 and connections provide that load may be transfer either above or below the nozzle fairing 50 to either or both of the outer and lower support rings 60, 40.

The shape of the pin 255 is shown as circular, however other shapes may be utilized. Similarly, a receiving aperture within the inner support ring 40 may be some corresponding shape which matches that of the pin 255 shape to transmit or support either or both of radial or tangential loading. Still further, one skilled in the art should realize that the embodiments of FIGS. 7 and 8 may be used in either the inner or outer support rings 40, 60.

Figure 14:
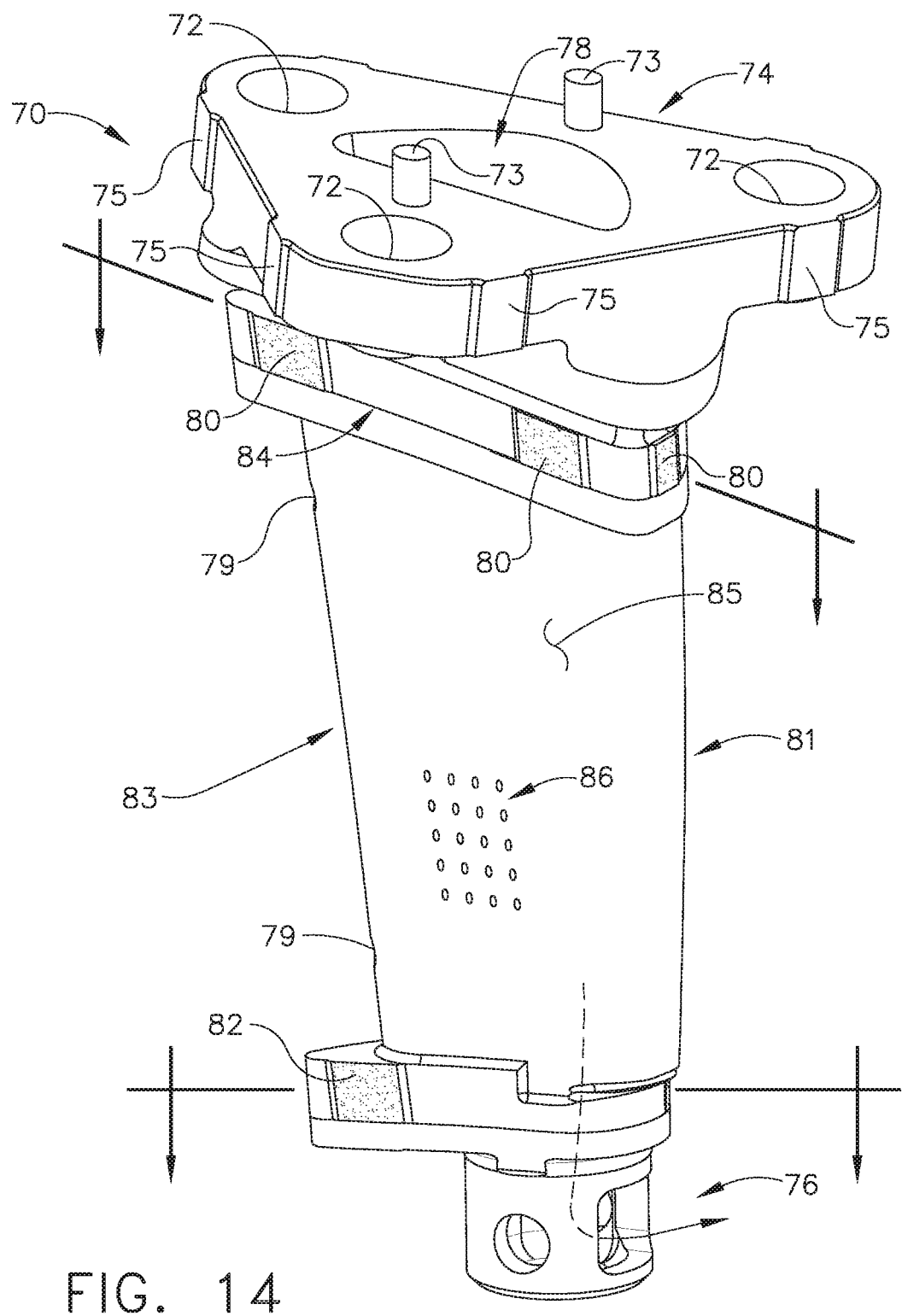
FIG. 14 is a perspective view of an exemplary strut.

Referring now to FIG. 9, section view of the strut 70 is shown with a section line through the plurality of load bearing pads 80, as shown in FIG. 5. In this view, the load bearing pads 80 are shown engaging the interior surface of the cooling flowpath 58 of fairing 50. Through these load bearing pads 80, load on the fairings 50 is transmitted to the strut 70. Specifically, as the fairing 50 encounters air flow and receives pressure load in a tangential direction, the fairing 50 is able to transmit this loading through the load bearing pads 80 to the strut 70. Similarly, the loading from the strut 70 may be transmitted to the outer support ring 60 by way of the load pads 75 (FIG. 14) on the flange 74 (FIG. 14).

With reference to FIG. 10, a section view is taken of the strut 70 at the load bearing pad 82, as shown in FIG. 5. According to the section view of FIG. 10, the view is shown looking down the strut 70. The inner band 52 is shown for reference as in the previous figure. The load bearing pad 82 is shown extending from a lower end of the strut 70 so as to engage the lower end of the fairing 50 and more specifically, the inside surface of cooling flowpath 58.

Figure 11:
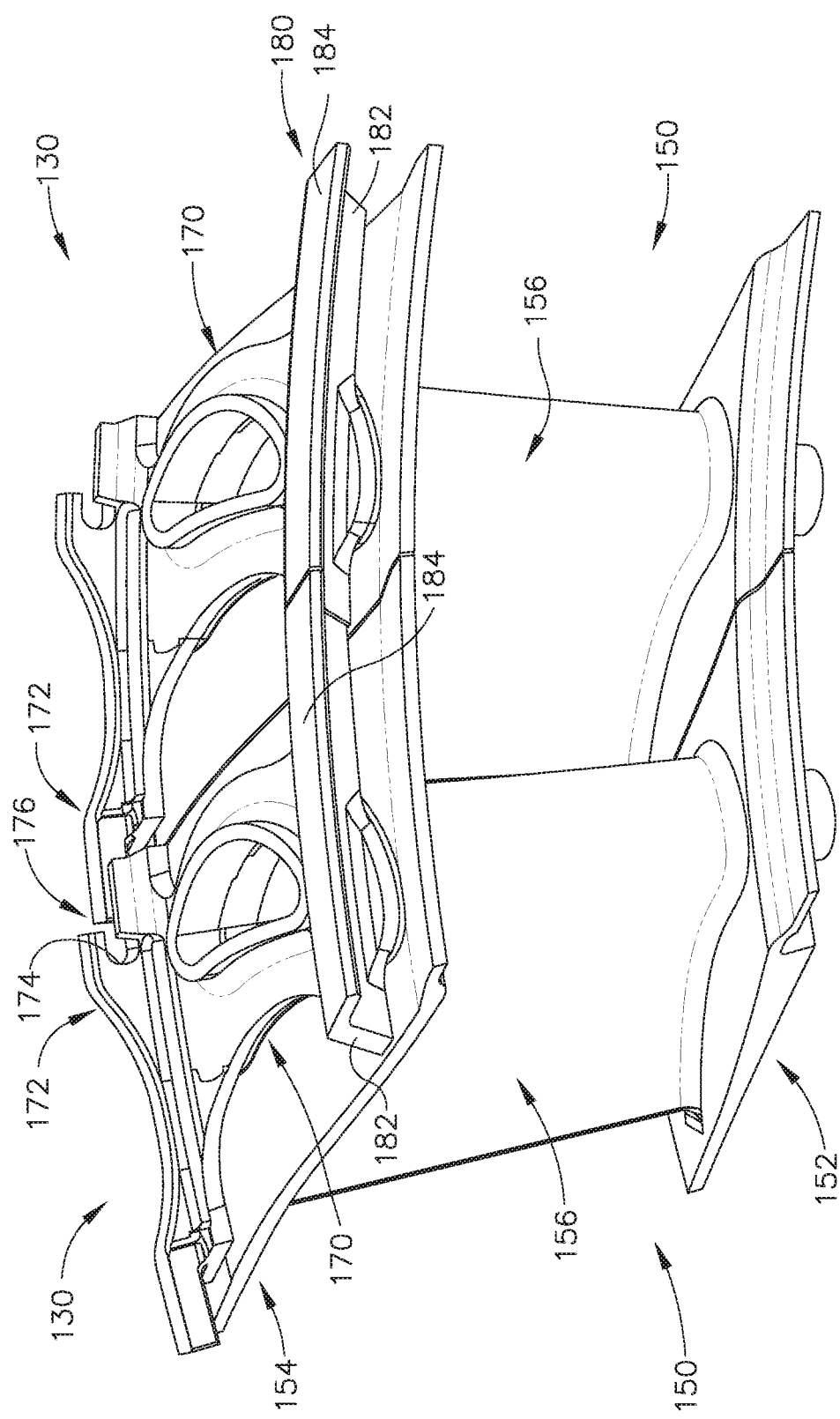
FIG. 11 is a perspective view of an alternative mounting structure for the nozzle segment.

Referring now to FIG. 11, a perspective view of an alternative nozzle segment assembly 130 is provided with a further embodiment for mounting the nozzle segment assembly 130. A nozzle fairing 150 includes an inner band 152 and an outer band 154 at radial ends of a vane 156. A strut 170 extends into the vane 156 and includes at least one shiplap 172 at an axial end of the outer band 154. The shiplap 172 is longer in the circumferential direction than the length of the outer band 154. One end of the shiplap 172 includes a shiplap notch 174 which receives a circumferential end of an adjacent shiplap 172. This notch 174 and shiplap 172 provide a shiplap joint 176. In the instant embodiment, the shiplap joints 176 are located at the aft end of the outer band 154. However, the shiplap joints 176 may alternatively be moved to the forward end of the outer band 154 or an intermediate location. Further, the shiplaps 172 and shiplap joints 176 may additionally, or alternatively, be used along the inner band 152.

At the forward end of the nozzle segment assembly 130 is an L-shaped shoulder 180. The shoulder 180 is defined by a first portion 182 extending from the outer band 154 and a second portion 184. Shoulder 180 is supported from the static structure 15 (FIG. 5) along with the shiplaps 172. The shoulders 180 and the shiplaps 172 are also connected to the strut 170 so that the support for each nozzle segment assembly 130 is provided by the static structure 15 (FIG. 5) and through the strut 170.

Figure 12:
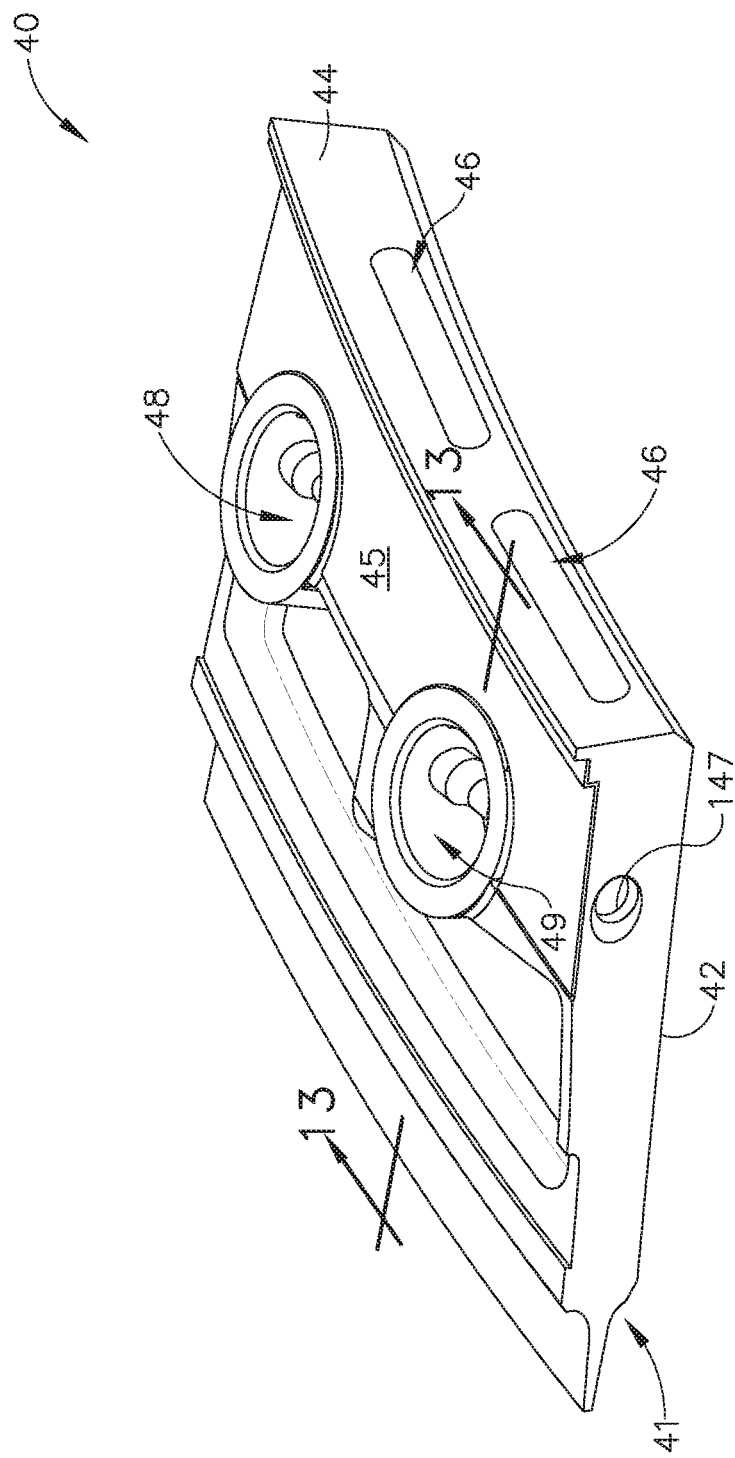
FIG. 12 is a perspective view of a seal box.

Referring now to FIG. 12, a perspective view of an exemplary inner support ring 40 is depicted. The inner support ring 40 may be formed as a single structure or may be formed of two or more pieces or structures. The instant embodiment utilizes a first portion 41 including the lower surface 42 and radially extending surface 44 and a second portion 45 which is inserted into the first portion 41. The second portion 45 may be press-fit, braised or fastened into the first portion 41. The second portion 45 may alternatively be formed integrally with the first portion 41. The second portion 45 provides a flow cavity for cooling air between the collars 48, 49 and the rotor purge feed holes 46.

Figure 13:
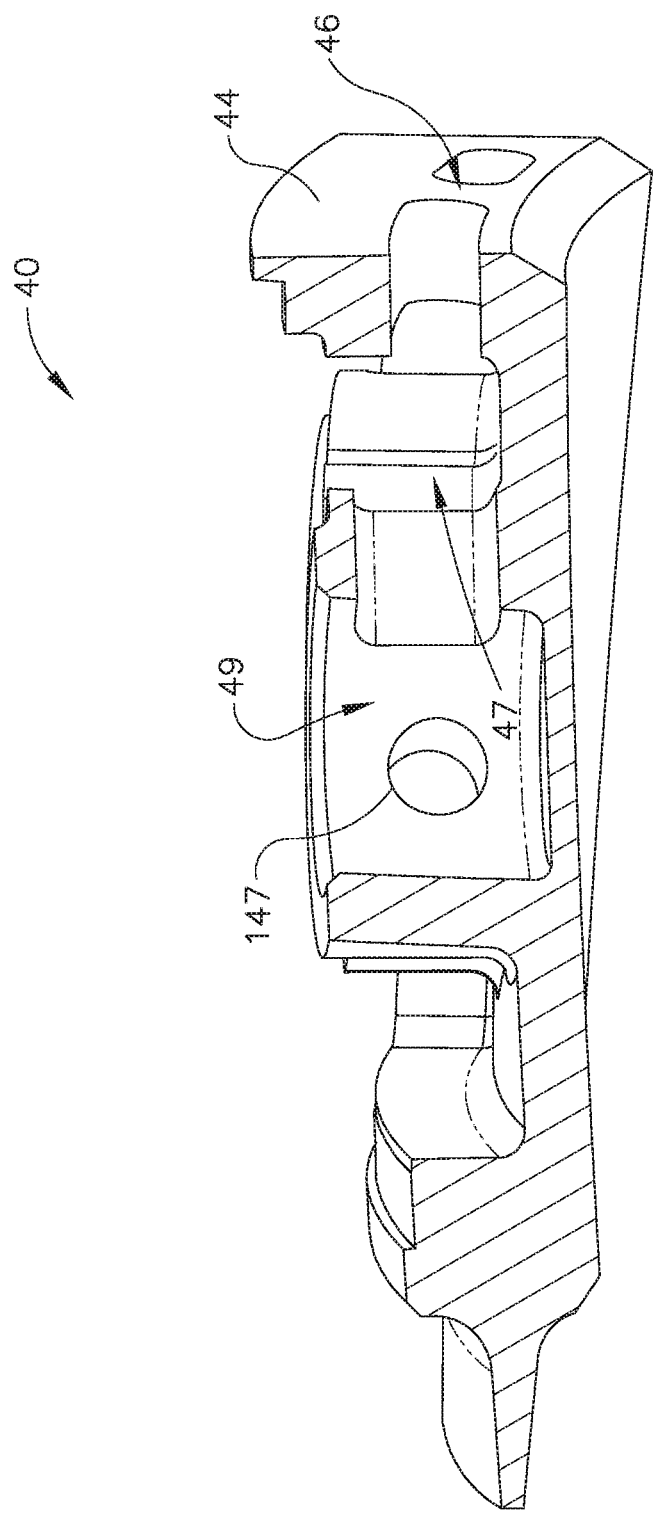
FIG. 13 is a section view of the exemplary seal box.

Referring now to FIG. 13, a side section view of the inner support ring 40 is depicted. In the embodiment, the section cut is made through the collar 49. The collar 49 is shown as being circular in the depicted embodiment, however alternate shapes may be utilized to receive a lower seal box interface 76 of the strut 70. Cooling air enters the inner support ring 40 from the strut 70 and moves in the axially forward direction to a cavity 47 which is in flow communication with the rotor purge feed holes 46.

The collar 49 provides a lower support for capturing the strut 70 and inhibiting circumferential movement of the strut 70 and axial movement of the strut 70. The collar 49 includes a fastening aperture 147 through which a fastener may be positioned and further engage the strut 70 to capture the strut 70 in position once placed within the collar 49. This inhibits radial motion of the strut 70 relative to the inner support ring 40. Radial motion may further be limited by the outer support ring 60.

Referring now to FIG. 14, a perspective view of the strut 70 is shown. At the top of the strut 70, the flange 74 is located and includes the plurality of fastening holes 72 which match a pattern provided in the outer support ring 60. With the matching pattern of fastening holes 72, the flange 74 is bolted to the outer support ring 60 providing an upper positioning limit of the strut 70 while the inner support ring 40 provides a lower limit. The flange 74 further comprises the cooling flowpath 78 for cooling air through the nozzle segment assembly 30. The flange 74 may also comprise a plurality of pads 75 about the peripheral edge to transmit load from the upper band of fairing 50 or to the outer support ring 60.

Beneath the flange 74 are a plurality of load bearing pads 80 which are primarily located in a position corresponding to the pressure side of vane 56 (FIG. 4), although this is merely exemplary and pads may be located at various locations other than corresponding to the pressure side. During operation, the pressure side of the vane 56 creates a force which pushes the vane 56 and fairing 50 in a circumferential direction of the gas turbine engine 10. The load bearing pads 80 receive this loading and transmit the loading to the strut 70 so that the fairing 50 is not damaged. While two load bearing pads 80 are shown on the pressure side of vane 56, additional load bearing pads 80 may be located for example in a location corresponding to the leading edge 81 of the vane 56 where the high pressure combustion gas engages the vane 56 and fairing 50.

The interior of the strut 70 is at least partially hollow providing to flowpaths 78 therein. According to one flowpath, cooling air may engage the cooling holes 86 for cooling of the vanes 56. These cooling holes 86 may feed film holes located at various locations in the vane 56. According to a second flowpath, the air, shown in broken line, moves downwardly through the strut 70 and out through the seal box interface 76 so as to provide rotor purge air into the seal box cavity 47 (FIG. 12) and through the feed holes 46 (FIG. 12).

A load bearing pad 82 is also shown at the lower end of the strut 70 which receives loading from the vane 56 as previously described and transmits the force load to the strut 70 which provides improved load handling for the nozzle segment assembly 30.

Along the right-hand side of the strut 70 extending downwardly is a body 85 which has a leading edge 81 and a trailing edge 83. The trailing edge 83 includes a plurality of cooling holes 79 which cool the trailing edge 83 of the vane 56. Accordingly the interior of the strut 70 provides flowpath communication to cooling holes 79 located at the trailing edge 83 as well as the seal box interface 76 for cooling of the inner support ring 40. It should be understood that while cooling holes 79 are shown at one location, additional locations of the strut 70 may comprise other such cooling holes. Also, the cooling holes 86 may be arranged in alternate patterns and configurations and should be limited to the specific pattern shown.

As an alternative, or in addition to the fastening holes 72, one or more studs 73 may extend from the upper surface of the strut 70. The studs 73 may locate the strut 70 relative to the outer support ring 60 (FIG. 4) or a static structure 15 (FIG. 5) such as an engine casing or other fixed structure. The studs 73 may also function to transfer some circumferential or tangential loading.

Figure 15:
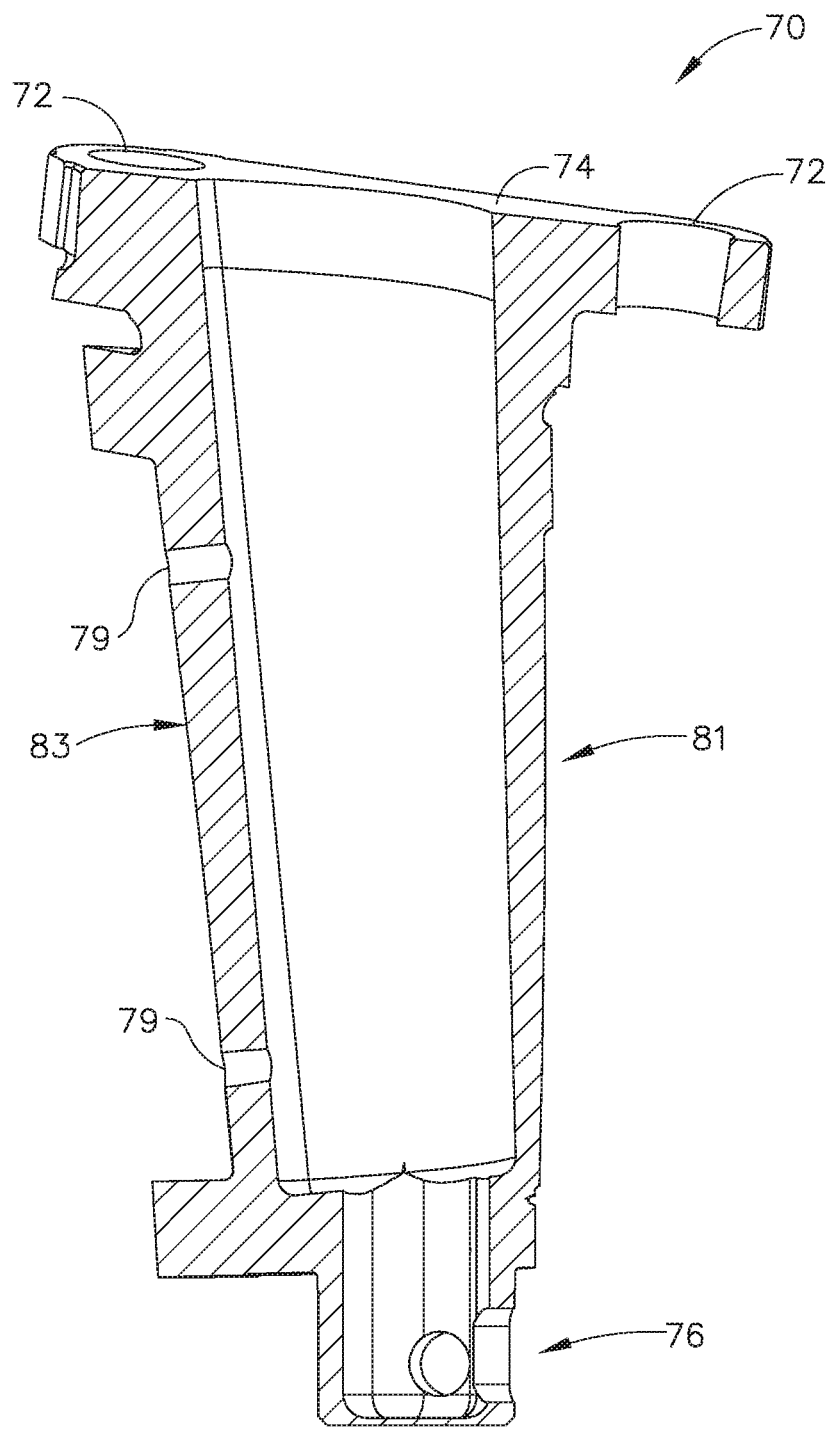
FIG. 15 is a section view of the exemplary strut of FIG. 14.

Referring now to FIG. 15, a side section view of the strut 70 is depicted. The flange 74 is shown at the upper end and one of the fastening holes 72 is depicted with a second aperture being cut through. While the interior of the strut 70 is depicted as being substantially open, alternative embodiments may include walls for directing flow of cooling air to desired locations. As previously mentioned, it is within the scope of this disclosure to provide cooling at different locations of the strut and the depicted embodiment is merely exemplary.

Figure 16:
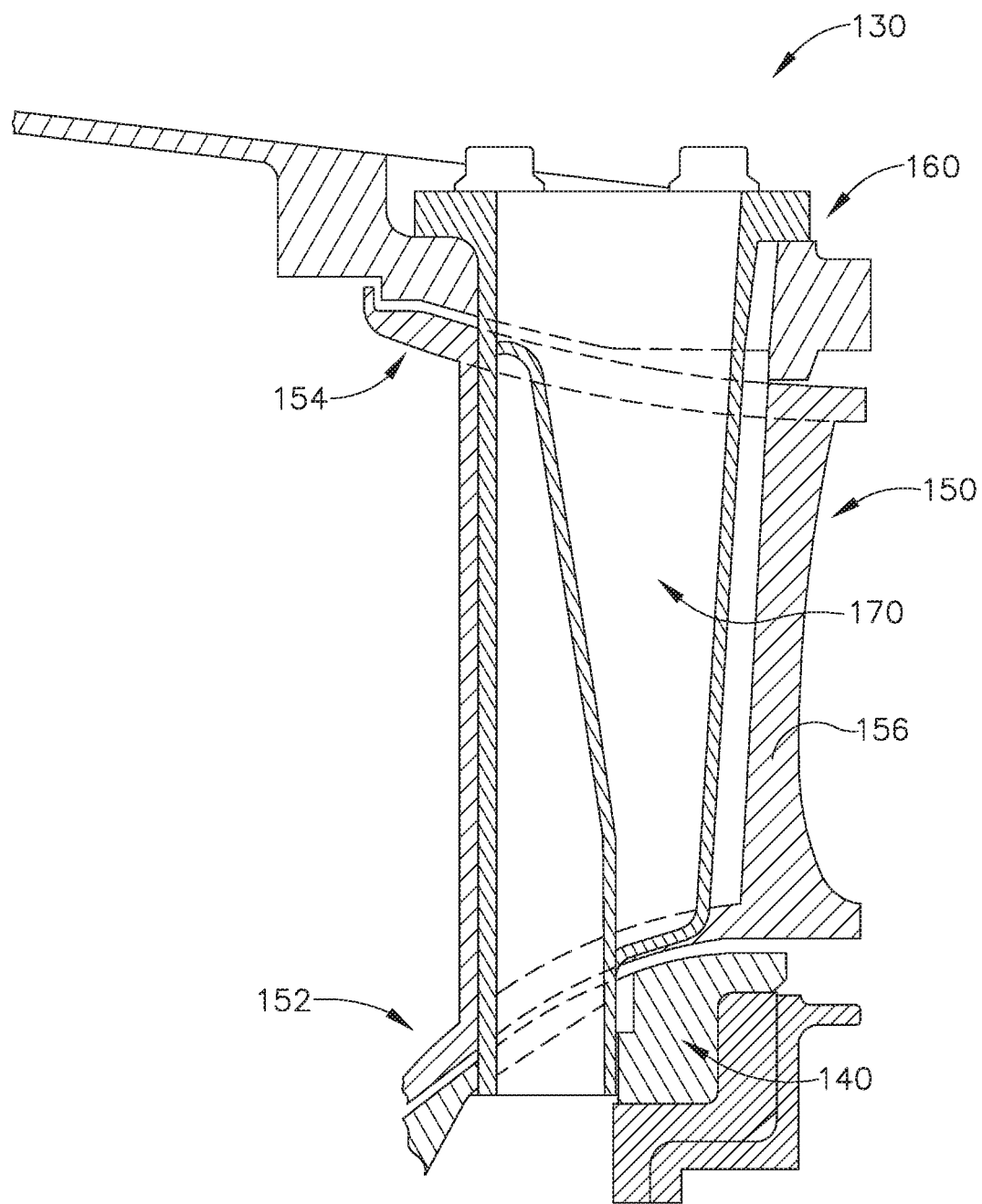
FIG. 16 is a cross section of an alternative construction for a nozzle assembly.

With reference to FIG. 16, an alternative embodiment of a nozzle segment assembly 130 is shown wherein inner and outer support rings 140, 160 extend 360 degrees rather than being formed of segments as in previous embodiments. The nozzle segment assembly 130 includes an outer support ring 160 which captures a strut 170 and a nozzle fairing 150 in position above an inner support ring 140. The instant embodiment utilizes inner and outer bands 152, 154 which are curved along the axial direction more than the previous embodiment. Additionally, the fairing 150 of the instant segment includes a single vane 156. Thus, it should be understood that the nozzle segment assemblies 30, 130 may vary in circumferential length and may vary in axial length and shape depending upon the components of the gas turbine engine 10 in the area where the nozzle segment assembly will be mounted and depending on design parameters for conditions within the gas turbine engine 10. For example, the nozzle segment assembly 30, 130 may be of preselected segmented length or may form a complete ring.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A nozzle segment assembly, comprising:
an outer support ring and an inner support ring;
a nozzle fairing formed of a low coefficient of thermal expansion material having an outer band, an inner band, and a vane extending between said outer band and said inner band; and
a metallic strut extending between said outer support ring and said inner support ring, said metallic strut allowing for load transfer between said nozzle fairing and said metallic strut,
wherein said metallic strut extends through said nozzle fairing and allows radial growth of said metallic strut through said vane, and
wherein said outer band of said nozzle fairing is positioned to engage with and transfer load to said outer support ring or said inner band of said nozzle fairing is positioned to engage with and transfer load to said inner support ring.

2. The nozzle segment assembly of claim 1, wherein said outer support ring and said inner support ring are 360 degree rings.

3. The nozzle segment assembly of claim 1, wherein said outer support ring and said inner support ring are arcuate segments.

4. The nozzle segment assembly of claim 1, wherein at least one of said outer support ring and said inner support ring are supported by a static structure.

5. The nozzle segment assembly of claim 4, wherein said at least one of said outer support ring and said inner support ring is supported in a cantilevered arrangement from said static structure.

6. The nozzle segment assembly of claim 4, wherein at least one of said outer support ring and said inner support ring are supported at an axial end.

7. The nozzle segment assembly of claim 1, wherein said metallic strut is connected to at least one of said inner support ring and said outer support ring by bolting, fastening, capturing, or being integrally formed.

8. The nozzle segment assembly of claim 1, wherein a radial position of said nozzle fairing is captured between said outer support ring and inner support ring.

9. The nozzle segment assembly of claim 8, further comprising an interface at a lower end of said metallic strut that extends into a collar of said inner support ring.

10. The nozzle segment assembly of claim 8, further comprising a pin joint at one of said inner support ring and said outer support ring.

11. The nozzle segment assembly of claim 1, further comprising a flowpath through said nozzle segment assembly, wherein said flowpath further comprises at least one cavity extending through said vane of said nozzle fairing.

12. The nozzle segment assembly of claim 11, wherein said flowpath further comprises at least one cavity extending through said metallic strut and in flow communication with said cavity of said nozzle fairing.

13. The nozzle segment assembly of claim 12, wherein said metallic strut has a plurality of cooling holes for impingement air on an interior surface of said vane.

14. The nozzle segment assembly of claim 13, wherein said vane of said nozzle fairing has a plurality of cooling film holes in flow communication with said flowpath, wherein said flowpath is further in flow communication with said inner band.

15. The nozzle segment assembly of claim 1, wherein said vane is integrally formed with said outer band and said inner band.

16. The nozzle segment assembly of claim 15, wherein the nozzle fairing is unattached to the outer support ring and the inner support ring such that the nozzle fairing floats along a radial direction.

17. The nozzle segment assembly of claim 16, wherein a radial position of said nozzle fairing is captured between said outer support ring and inner support ring.

18. The nozzle segment assembly of claim 1, wherein the vane is unattached to the outer support ring and the inner support ring such that the vane floats along a radial direction.

19. The nozzle segment assembly of claim 1, wherein said nozzle fairing has a stud positioned to allow transfer of load from said nozzle fairing to said outer support ring or said inner support ring.

20. The nozzle segment assembly of claim 1, wherein said nozzle fairing makes direct contact with said inner support ring or said outer support ring.

* * * * *